(12) United States Patent
Vedder

(10) Patent No.: US 6,895,021 B1
(45) Date of Patent: May 17, 2005

(54) METHOD AND APPARATUS FOR TIME-PROFILING T-CARRIER FRAMED SERVICE

(75) Inventor: Mark Vedder, Manalapan, NJ (US)

(73) Assignee: AT&T Corp., New York, NY (US)

( * ) Notice: Subject to any disclaimer, the term of this patent is extended or adjusted under 35 U.S.C. 154(b) by 40 days.

(21) Appl. No.: 10/672,332

(22) Filed: Sep. 25, 2003

Related U.S. Application Data

(63) Continuation of application No. 09/471,560, filed on Dec. 23, 1999, now Pat. No. 6,654,375.
(60) Provisional application No. 60/113,929, filed on Dec. 24, 1998.

(51) Int. Cl.[7] .................................................. H04J 3/24
(52) U.S. Cl. ....................... 370/474; 370/410; 370/503; 714/704
(58) Field of Search ................................ 370/394, 474, 370/410, 503, 506, 509, 510; 375/224, 225, 226, 227; 714/704

(56) References Cited

U.S. PATENT DOCUMENTS

| | | | | |
|---|---|---|---|---|
| 4,970,714 A | * | 11/1990 | Chen et al. .................. | 370/216 |
| 5,115,431 A | * | 5/1992 | Williams et al. ............. | 370/394 |
| 6,404,804 B1 | * | 6/2002 | Mannering et al. ......... | 375/222 |

* cited by examiner

*Primary Examiner*—Wellington Chin
*Assistant Examiner*—Raj Jain

(57) ABSTRACT

A method and apparatus for frame-level, sub-second error reporting is disclosed. Trouble profiles are compiled using synchronous constant-frame error detection and, during a transmission hiatus, pseudo-synchronous constant-frame error detection so as to describe transmission integrity down to the millisecond. This provides profiles that can be used to trace the cause(s) of outages to complex networks including outages from network activity. The outage profiles obtained from the described device can be used to determine and confirm the source of sub-second, or more, transmission outages.

8 Claims, 4 Drawing Sheets

METHOD AND APPARATUS FOR TIME-PROFILING T-CARRIER FRAMED SERVICE

CROSS-REFERENCE TO RELATED APPLICATION

This application is a continuation of U.S. application Ser. No. 09/471,560, filed Dec. 23, 1999, now U.S. Pat. No. 6,654,375, and allowed as of Jul. 28, 2003, which claims benefit of Provisional Application No. 60/113,929 filed Dec. 24, 1998.

BACKGROUND OF THE INVENTION

1. Field of the Invention

The present invention is related to the maintenance of communications networks. More particularly, the invention is directed to improved monitoring of transmissions errors in telecommunications networks.

2. Discussion of Related Art

It has been known to provide synchronous-transfer modes (STM) control of traffic using frames for such services as T-1, T-3 and others. More recently, hybrid ATM/TDM networks provide synchronous-transfer mode (STM) control of traffic from both the ATM and TDM payload sources. They permit a graceful, piecewise implementation of the megabits-per-second speeds of asynchronous transfer mode (ATM) packet-routing segments within existing voice, fax and data-communications networks having conventional digitally-switched call circuits (DSCs) that carry STM communications. STM communications use a signal-reference frame that provides dedicated time slots for the time-division multiplexing (TDM) of signals passing over the individual links in an STM network.

In theory, it should be possible to use the TDM trouble shooting criteria for monitoring the quality of hybrid ATM/TDM service and obtain the level of quality and efficiency achieved in purely TDM networks. However, field experiments that attempted real-time detection of transmission errors in call circuits combining ATM and TDM payloads resulted in imprecise descriptions of the troubles. The potential throughput efficiency advantages of the hybrid ATM/TDM systems cannot be realized so long as false-positive trouble flags mask the true nature and location of trouble spots in a network.

Even for purely TDM payloads, the conventional reporting of transmission errors as "errored seconds", does not accurately reflect the condition of the data actually received. The errored seconds are measured using parity bit (PB) or cyclic redundancy check (CRC) analysis, but they are determined using a fixed frame clock. In this time-locked conventional error reporting scheme, out-of-frame format errors (OOF) preempt the results of parity and CRC tests, that is, every frame transmitted while an OOF condition exists is a continuation of the transmission error, regardless of the accuracy of the data within that frame. When both the PB and CRC errors and the OOF errors are reported together as a total length of time, the entire time elapsed before the expected frame format reappears with the correct intra-frame parity or redundancy, is reported in those "errored" or "OOF" seconds.

Conventional TDM service profiles reporting OOF "errored seconds" are compiled by terminal equipment such as the DDM-1000 or the DCS 3/1, or an interface unit (IU) that is an adjunct to such terminal equipment.

Over-reporting of transmission errors is particularly serious for the digital service providers (DSPs) who are subject to tariff regulations. Often times the detection of transmission errors fails to distinguish between the types of errors. This distinction could be important since a DSP must be prepared to defend its performance as a licensee by proving the quality of their service and the reliability of the service that they have provided to the public under their operating licenses.

Greater accuracy in quantifying data losses, and greater detail reporting the occurrence of events that disrupt TDM communications, is especially important for trouble analysis in long-distance circuits. The complex interactions that occur when the service provided to a customer involves multiple companies, during "bridge and roll" re-direction of calls, for example, are accompanied by an increase in the incidence of abnormal service interruptions of unknown origin.

In hybrid ATM/TDM networks voice traffic is, in part, carried on asynchronous packet-switched circuit. Terminal adapters (TA), operating in the ATM domain reformat the payload received from conventional TDM networks into packets. In the ATM domain, voice and data are entirely recoverable from TDM inputs having OOF errors of less than a frame. Unfortunately, using standard TDM error criteria that slight OOF timing error will be reported as a serious outage until framing is reset. OOF-based error reporting has been a blunt instrument for analyzing trouble in conventional TDM payloads. In the new hybrid ATM/TDM networks the instrument is even less useful as it swamps the TDM parity and redundancy test and other measures that reflect actual signal degradation at the interface between TDM and ATM systems.

The data rate at the payload inputs to ATM networks need not be fixed and the relative packet timing across an ATM call is highly variable. There are three principal sources of delay in ATM communications: queuing delays in the packet switches; digital voice compression coding/decoding delays; and voice-packet assembly delays. In particular, the quality of a voice signal transmitted across an ATM network is sensitive to round-trip delay and packet-order error, but not to "framing errors" or even individual dropped packets. Thus, the Terminal Adapters on the boundary between ATM and TDM networks that report OOF incidents as call outages do not accurately describe the frequency or extent of any impairment of the voice signal received by the ATM portion of the network, nor by the customers using the hybrid networks.

The present invention provides constant-frame error detection with synchronization criteria to provide a more precise signature of a circuit impairment.

SUMMARY OF THE INVENTION

In accordance with the present invention, a sub-second circuit impairment and framing-error profile is produced for a framed signal by a profiler having a bit counter, a frame pattern detector, a sync circuit and a profile extractor. Each time the frame pattern detector detects a frame in the framed signal, it produces a detected frame signal that resets the bit counter. The bit counter then begins to count the number of bits in the framed signal again. When the count in the bit counter reaches the number of bits expected in a frame of the framed signal it produces an estimated frame signal. If the estimated frame signal and the detected frame signal do not coincide with each other, a framing-error signal is produced.

Preferably a default frame signal is generated by a sync circuit to maintain accurate synchronization of detector and received signal when it happens that no bits are detected at the time when a detected frame signal is expected and at a time period calculated as a running average of the time between recent detected-frame signals has also expired without either a detected frame or an estimated frame signal. Because this pseudo-synchronous default signal does not coincide with a detected frame signal, a framing-error signal is produced.

In one embodiment, the detected frame signal and the bit count expected in each frame are also used to test data integrity. If the data (that is the number of bits expected in a frame after each detected frame begins) fails the test, a data error signal is produced.

Preferably, the timing of each incidence of an error signal is recorded by an identifier and that identifier is stored in a profile. When the error signal is a data error signal, the timing is preferably identified by a time-stamp value.

The output of the device of the present invention is a binary code message that establishes the format of the "profile." This message can be truncated when no impairments are detected.

The invention provides a compact sub-second error profile capable of resolving multiple sub-second error events so that the operation of high-speed signals, such as those in T1 and T3 networks, and synchronous optical networks (SONET) and their interactions with signals in other networks, can be accurately described, even when the T-carrier signal goes OOF. Sub-second accuracy permits trouble profiles built from bit-error data to be economically communicated across networks and analyzed to improve transmission quality and reliability. It also permits the technician to distinguish OOF timing errors from dropout or noise events causing data corruption. This sub-second accuracy is important for defending service reliability in ATM/TDM networks. In TDM networks it is particularly important where customer service, end-to-end, requires the facilities of multiple service providers. The resulting increase in abnormal disruptions from "unknown" sources requires detailed failure analysis to assure proper accountability.

DETAILED DESCRIPTION OF A PREFERRED EMBODIMENT

Figure 1:
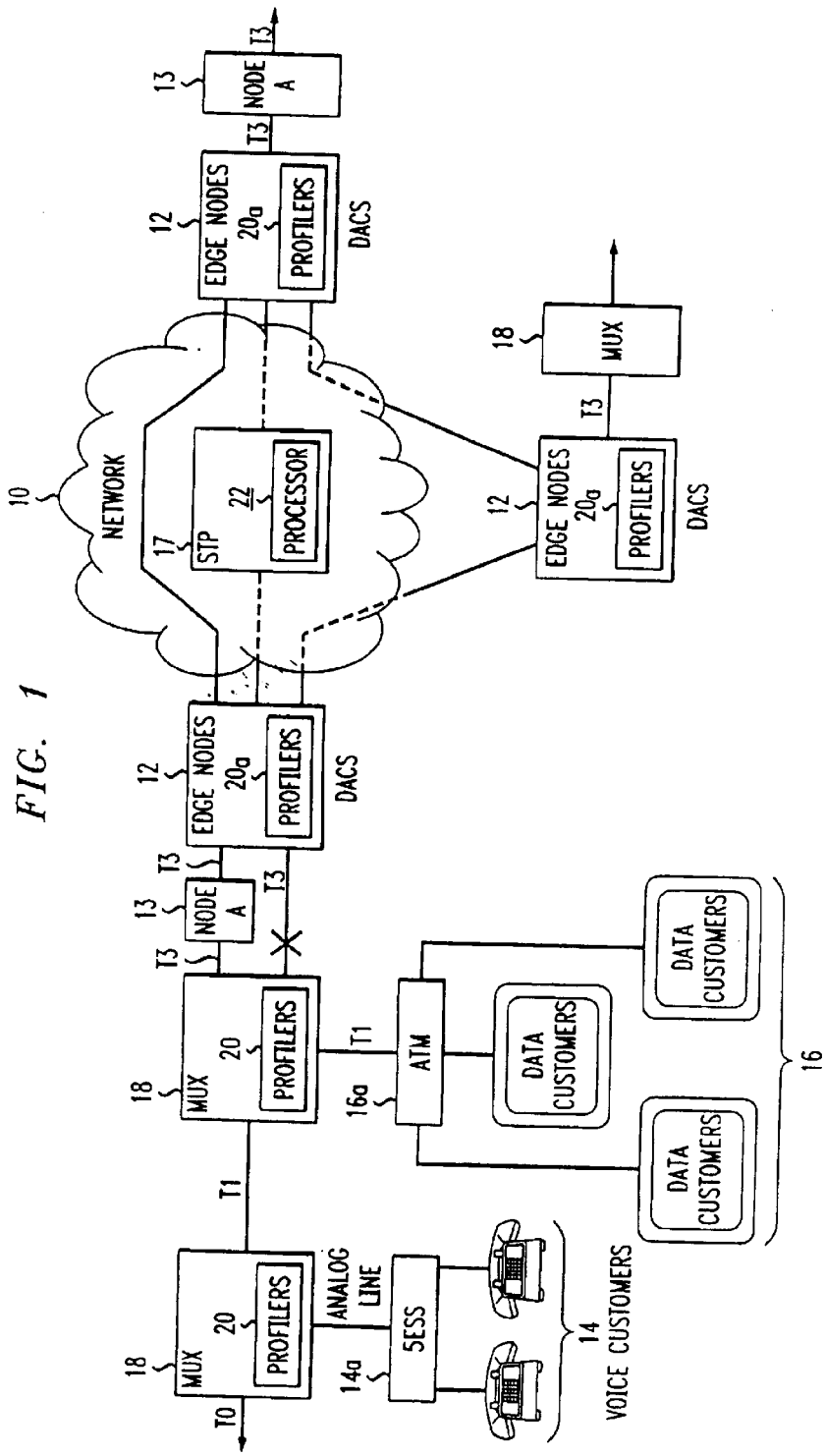
FIG. 1 is a diagram of a T-carrier network on a SONET backbone with analog and ATM sub-networks, having transmission-error detection in accordance with the present invention.

With reference first to FIG. 1, SONET transmission is implemented in an optical-fiber long-distance backbone network 10 for T-carrier framed data and voice payloads received from T3 lines through respective digital access and cross-connect systems (DACS) at the edge nodes 12 of the network 10. The T3 lines are multiplexed to other T3 nodes 13 and to T1 lines in local networks, which may serve analog customer terminals 14 through conventional 5ESS switches 14a as well as ATM customer terminals 16 through respective terminal adapters (TA) 16a.

Transmission quality in the SONET network 10 is monitored at a signal transfer point (STP) 17. The multiplexers 18 at the T3/T1 and T1/T0 drops have profilers 20 that assemble sub-second framing-error and data-error profiles for identifying transmission problems. Sub-second framing-error profiles are also assembled by profilers 20a in the edge nodes 12 of the SONET network 10. These profilers 20a may be in the DACS itself, or in an interface unit (IU) associated with the DACS. The compressed frame data provided by these frame-error profiles is used for analyzing the source of such trouble, as well as generating error-rate statistics. The profiles provide both errors-per second values and sub-second framing profiles, rather than just OOF-seconds statistics, but they report only error incidents, thereby minimizing the administrative bandwidth required by the network.

Circuits in the SONET network that have excessive frame-error rates, or are implicated in customer reports of noise on the line, calls dropped and call completion failures, are trouble-flagged by the network-supervisor processor 22 which could be associated with STP 17. Call routing may by-pass the flagged circuits until their statistics are analyzed and any trouble indicated therein is cleared. Certainly calls requiring "guaranteed" classes of service, such as, for example, the "800" calls made by airlines' customers, will be routed around the trouble flags if at all possible.

Figure 2:
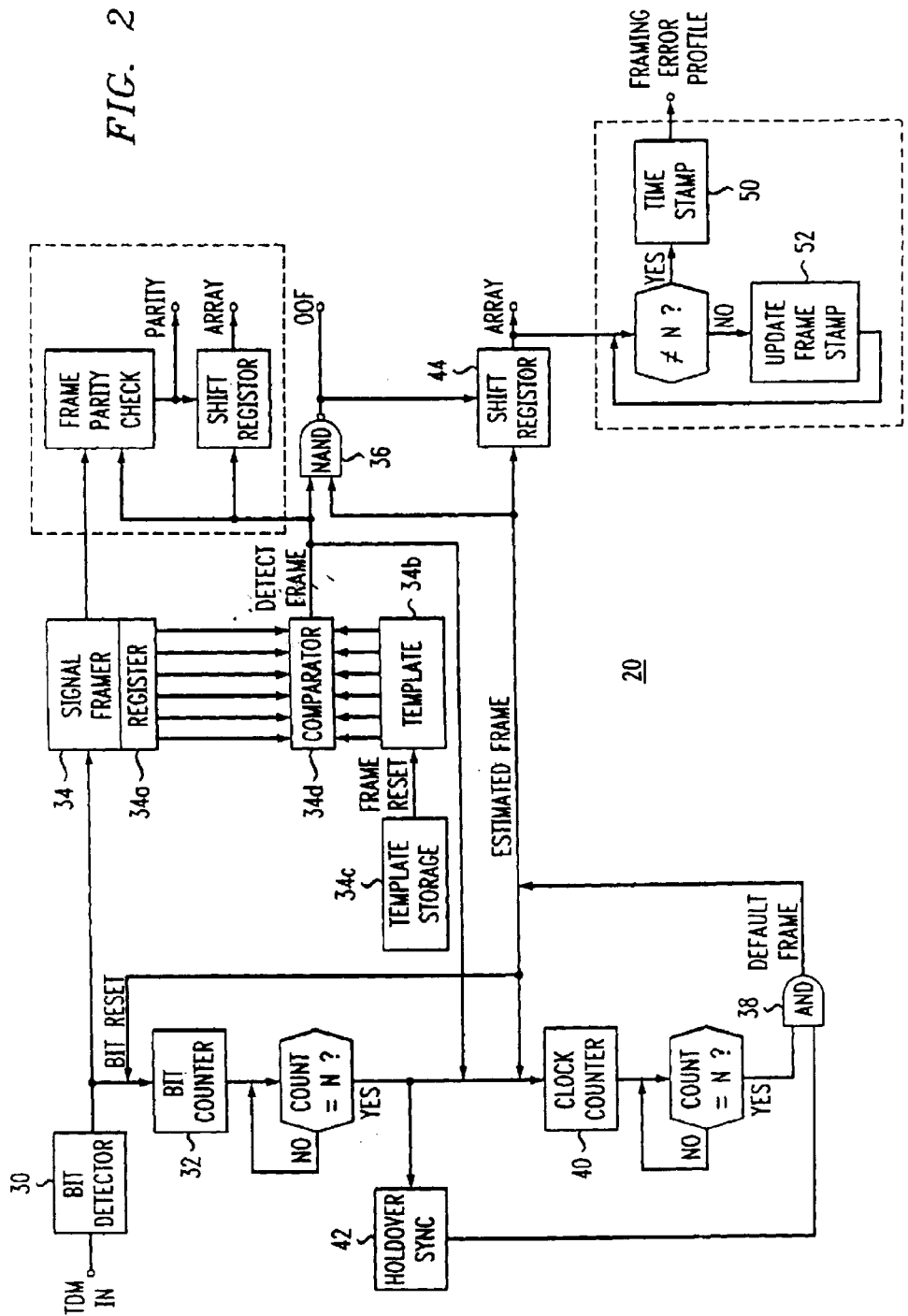
FIG. 2 is a schematic diagram of sub-second error detection apparatus in accordance with the present invention.

As shown in FIG. 2 bits in the digital signal received by a multiplexer 18, for example, are detected and regenerated by signal conditioning circuit 30 at the input to the profiler 20. The detected bit stream is supplied to a counter 32 and a signal framer 34. The signal framer 34 advances the bit stream through a register 34a one bit at a time and compares the bits in the register against a frame-format template 34b each time the bits advance. The profiler may be adapted to a variety of T-framed telecommunications formats by retrieving a respective frame format template, having an accompanying set of frame and bit timing standards, from the template storage 34c. A template that is compatible with the telecommunications format of the signal applied to the "TDM IN" input of the profiler 20 is selected. Each selected template 34b represents the relative locations and the values of the frame bits for the T-framed signal format used by the TDM signal received at the input.

The device requires that it be synchronized to the incoming signal for a time so that the Bit Counter/Holdover Sync section can provide ESTIMATED FRAME signals at the correct time.

For example, in T1 service, transmitted at 1.544 Mbits/sec., each T1 frame uses 192 databits+1 frame bit to carry 24 T0 channels. However, the "SF" T1 format standard uses a 12-bit frame sequence "1000 1101 1100" so that an "in-frame" determination is actually made for groups of twelve SF standard T1 frames. The extended SF standard (ESF) uses only six bits "001011" for 24 T1 frames, reserving 18 bits for in-band system administration signaling. SF-standard OOF frame errors are flagged when 2 consecutive frame-bit errors are detected. ESF-standard OOF frame errors are flagged when 4 consecutive frame-bit errors are detected.

In T3 service, transmitted at 44.736 Mbits/sec., the T3 "ASYNC (M13)" or "CBIT" format standard uses a more complex 31-bit frame sequence that is repeated for redundancy "X1001X1101001001001m1M1001M1001". In this T3 frame sequence, X is a control bit that can have a value of either "1" or "0" and "M" and "m" are frame alignment bits having values of "1" and "0" respectively. T3-standard frame errors are flagged when 3/16 consecutive frame-bit errors or 2 out of 3 consecutive alignment bit errors are detected.

In SONET service, an STS1 transmitted at 51.84 Mbits/sec., carries framing information as overhead and the framing sequence is a word having two consecutive bytes "A1" and "A2", where the expected over-all pattern is "111101100010100" (F628 Hex) bytes. SONET-standard frame errors are flagged when 4 consecutive framing words are erroneous. In this and in the other types of service, each errored frame sequence event or pseudo-synchronous event is recorded in a framing-error profile.

When the comparator 34d detects a coincidence between the framing bit values represented by the selected template 34b and the bits in the register 34a, the output of the comparator 34d goes high. The output of this comparator 34d is supplied to the first input of the "OOF" NAND gate 36.

This device requires synchronization of the valid frame signal and the monitored signal. This can be done using counter circuit 40.

The bits forwarded to the signal framer 34 are also received by the bit counter 32 that is connected in parallel with the signal framer 34. The bit counter 32 is reset whenever the bit counter 32 advances to "N" or the output of the "CLOCK" AND gate 38 goes high. When the counter 32 advances to the value "N", that is a number of bits expected in a frame for the format of the selected template 34b selected from template storage 34c, a positive input is supplied to the second input of the "OOF" NAND gate 36. A framing-error incident value of "1" will be recorded in the shift register 44 each time an "ESTIMATED FRAME" pulse is generated, unless the "ESTIMATED FRAME" pulse coincides with a "DETECTED FRAME" pulse at the "OOF" NAND gate 36. If those pulses coincide, a null framing-error value of "0" is output by the NAND gate 36.

Before the bit counter 32 advances to the value "N" the second input of the "OOF" NAND gate 36 will go high if both gates of the "CLOCK" AND gate 38 go high. The first input of "CLOCK" AND gate 38 goes high when the clock counter 40 advances to a numerical value greater than "N" before it is reset by the comparator 34d, as described above with reference to the bit counter 32 and the same numerical value "N". The second gate of the "CLOCK" AND gate 38 goes high when the holdover sync goes high the holdover sync which keeps a running average of the intervals between "RESET" pulses that are within a given range on either side of an interval value representing the standard nominal frame rate of the format of the selected template 34b. The clock counter 40 is advanced at a frequency representing a standard nominal bit rate for the format of the selected template 34b. Thus, the output of the "CLOCK" AND gate 38 goes high only after both the nominal frame interval and the holdover-sync interval have been exceeded before a "RESET" pulse is received from the comparator 34d.

This "CLOCK" AND gate 38 provides the "flywheel" that maintains the sub-second resolution of the frame profile when the telecommunications signal applied to the "TDM IN" input to the profiler is interrupted, halting the bit counter 32. The flywheel module is used to provide an Estimated Frame pulse at the regular intervals that would occur for a normal, unerrored, stream of data.

In sum, the constant-frame trigger signal provided by the "DEFAULT FRAME" pulse in periods when the telecommunications signal is quiescent, and by the "DEFAULT FRAME" pulse in cooperation with the bit counter 32 when the signal is corrupt, provide pseudo-synchronous constant-frame error detection in the absence of a "DETECTED FRAME" pulse.

The shift register 44 clocks out an nx1 array of the framing-error values when the register 44 is full and adds each nx1 array 46 to an nxT array which is discarded if it is not needed for on-going performance audit or maintenance work. The nxT array 46 is also filtered to produce a framing-error profile 48 providing a time-stamp entry 50 for each framing-error incident value "1" in the nxT array 46. A frame-stamp entry which is incremented 52 for each value in the nxT array 46 may also be provided for each of the framing-error incident values "1" to record the relative position of the errored frame among the other frames in the nxT array. This will occur particularly in circumstances where frame intervals in the telecommunications signal are highly variable.

Figure 3:
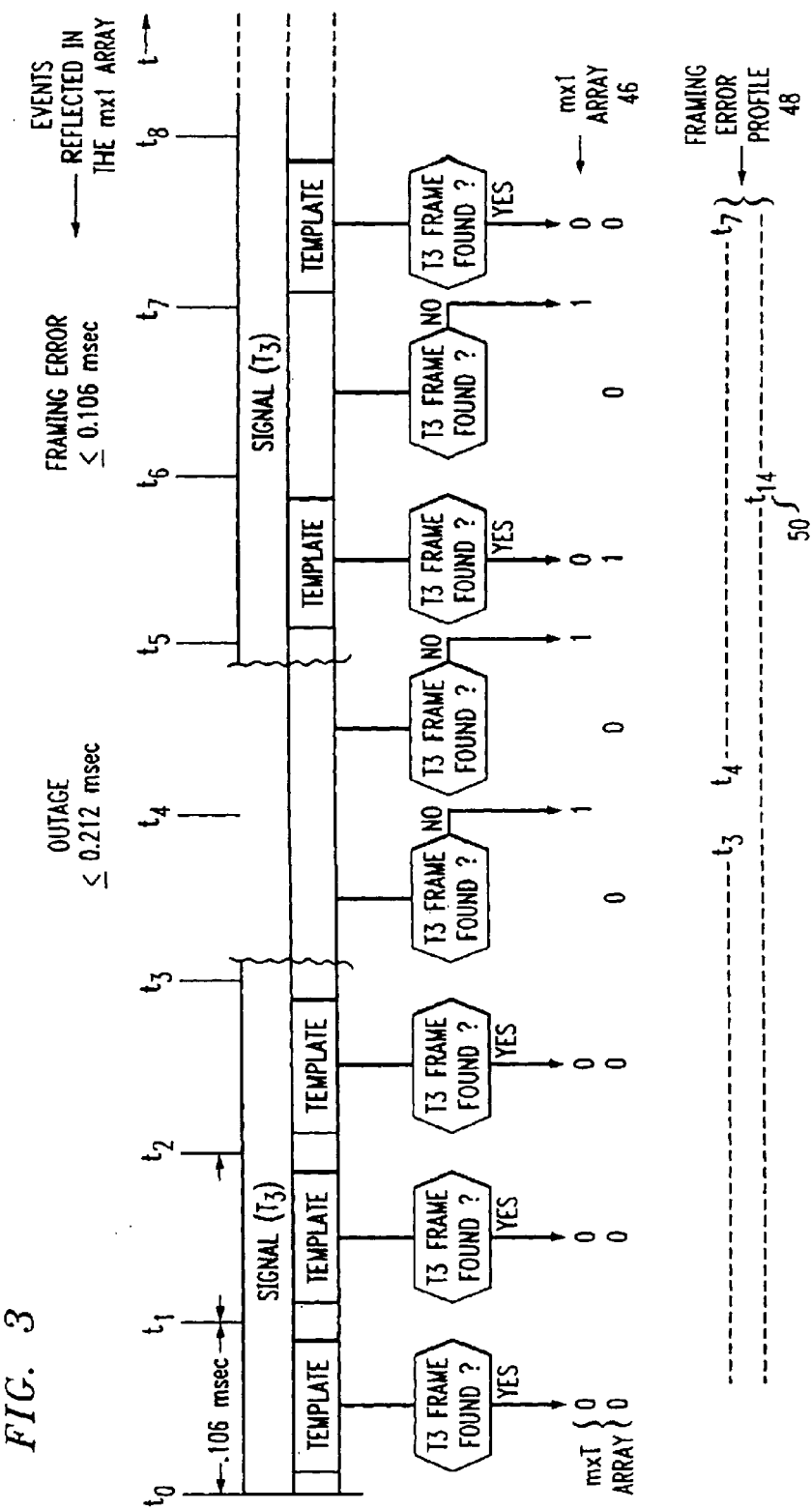
FIG. 3 is a schematic timing diagram for the apparatus of FIG. 2 showing synchronous constant-frame error detection in a period when the signal is OOF and pseudo-synchronous constant-frame error detection during an outage, when frame format information is absent from the signal.

FIG. 3 illustrates the derivation of a "time-stamped" framing error profile from transient events causing framing errors. The time-stamp values may be accumulated by a profiler 20a for a convenient period of time before being transmitted to the supervisory processor 22 in a burst, as an array filled with time-stamp values, to conserve bandwidth.

The "DETECTED FRAME" pulse produced by a profiler 20, such as the one in the multiplexer 18 nearest to the cut "X" in the T3 cable shown in FIG. 1, may also be extended to a data-integrity profiling circuit, shown in FIG. 2 to evaluate signal corruption as well as frame timing. The nx1 arrays of frame-by-frame data-integrity values "0" and "1" would then be filtered and all integrity-error values "1", would be time stamped to produce a data error profile of events that can be time-linked to events reflected in the framing-error profile. The series of frames represented by the "DETECTED FRAME" pulses may be discontinuous, unlike the framing error profile. Thus, time stamps rather than frame stamps must be used to coordinate data and framing error profiles, and the framing error profiles of different links in a circuit or different circuits within the sample physical trunk. Similarly, the "DETECTED FRAME" pulse may be used as a trigger signal for synchronous, constant-frame error detection in an OOF signal using the PB or CRC bit test protocols, or party checking, despite the existence of an OOF condition.

The trouble profiles compiled in accordance with present invention, using synchronous constant frames, and pseudo-synchronous frames when frame sequences cannot be detected in the data, particularly when transmission is interrupted and the carrier is temporarily absent, are accurate down to the millisecond. Furthermore, the present invention protects network integrity by permitting the cause of outages to be accurately traced to complex network interactions, by distinguishing delays and disruptions that cause framing errors from data-corrupting events which occur independent of frame-format timing.

For example, in FIG. 1, the cross-connect changes required for the bridge-and roll redirection of calls through alternate node "A" 13 around the cut "X" in the T3 cable will trigger OOF events all along the paths of the affected call circuits. However, the profilers 20 in the multiplexers 18 serving the 5ESS switch 14a and the ATM terminal adapter 16a can verify that the lost-data complaints from its data customers, and signal quality trouble experienced by voice customers coincided precisely with the cable-cut event affecting the T3 line. This distinguishes that event from events local to the T1 or SONET lines.

The profiler 20 in the multiplexer 18 serving the analog line through the 5ESS switch 14a can also demonstrate that signal-quality troubles reported by the voice-grade customers 14 was caused by the T3 framing-error outage. Furthermore, by selectively using the data integrity checking, the profiler 20 can also determine the sources of noise events that appear on local voice-grade lines apart from reported circuit outage and delay events, particularly noise events that occur while framing is within specification, is to from the T1 or analog lines, thus authoritatively resolving system-integration accountability issues.

Figure 4:
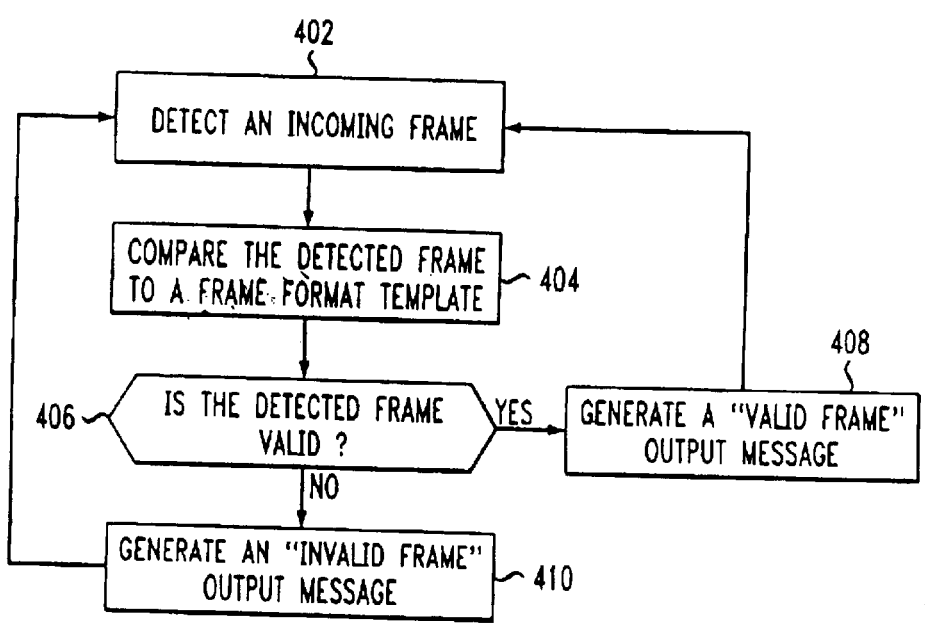
FIG. 4 illustrates a flow chart with steps for detecting sub-second errors in accordance with the present invention.

FIG. 4 is a flow chart with steps for detecting sub-second errors in accordance with the present invention. These steps may be implemented, for example, as a computer program or as computer hardware using well-known signal processing techniques. If implemented in software, the computer program instructions are stored in computer readable memory, such as Read-Only Memory (ROM), Random Access Memory (RAM), magnetic disk (e.g, 3.5" diskette or hard drive), optical disk (e.g., CD-ROM) and so forth. In accordance with one embodiment of the present invention, these steps are implemented by the apparatus of FIG. 2.

In step 402, the apparatus detects a frame from within a T-framed input signal.

In step 404, the apparatus compares the detected frame with a frame format template which is compatible with the frame format of the input signal.

In step 406, the apparatus determines whether the bits of the detected frame match the bits of the frame format template. If the bits match, the apparatus proceeds to step 408 and then returns to step 402 to detect the next frame in the input signal. If the bits do not match, the apparatus proceeds to step 410 and then returns to step 402 to detect the next frame in the input signal.

In step 408, the apparatus generates a "valid frame" output message at a rate which is synchronized with the expected frame rate of the signal input to the apparatus. As described above with respect to FIG. 3, this output message might be a "0" bit.

In step 410, the apparatus generates an "invalid frame" output message at a rate which is synchronized with the expected frame rate of the signal input to the apparatus. As described above with respect to FIG. 3, this output message might be a "1" bit.

After implementing the steps described above with respect to FIG. 4, the present invention generates an output signal comprising a series of bits which depict the integrity of the input signal at the frame level as a function of time. The bit rate of this output signal is synchronized with the expected frame rate of the input signal. Thus, a profile of the telecommunications signal is provided.

The method and apparatus of the present invention has been described with particular reference to presently preferred embodiments thereof. However, it will be apparent to one skilled in the art that modifications and variations are possible within the spirit and scope of the invention. Furthermore, this error-detection circuit has been described in a schematic fashion, to assure that the one skilled in the art can make and use the method and apparatus of the present invention without undue experimentation. The functional block diagram in FIG. 2 and the output shown in FIG. 3 may be physically implemented by various suitable devices and formats already known in the art.

What is claimed is:

1. In a network having a plurality of links between nodes and at least one node having an administrative module which provides error data for at least one link, a method of detecting network trouble comprising the steps of:

(a) detecting a data frame in a signal on a link;

(b) counting the bits arriving after the detection of the data frame until reaching a predetermined number of bits designating a frame;

(c) generating an estimated frame signal at the conclusion of the bit counting of step (b);

(d) comparing the detected data frame of step (a) to the estimated frame of step (c) and defining a frame error to occur if the two signals do not coincide;

(e) synchronizing the detection of errors in frames on said link to the timing of the detected data frame so as to avoid overcounting bit errors in the signal on the link; and (f) calculating the number of frames on said link having errors as an error rate per unit of time.

2. The method of claim 1 in which the error rate is calculated as frames errors-per second.

3. The method of claim 1 in which error detection for the present data frame is synchronized to the timing of a data frame detected in a sequence of data frames that is continuous with the present data frame.

4. The method of claim 1 in which bit error detection for the present data frame is synchronized to the timing of a data frame detected in a sequence of data frames that is not continuous with the present data frame.

5. A method of assembling a transmission performance profile for a circuit having multiple links in a network having a plurality of circuits and at least one node having an administrative module which provides error detector for at least one circuit, the method comprising the steps of:

detecting a data frame in a signal on a link;

counting the bits arriving after the detection of the data frame until reaching a predetermined number of bits designating a frame;

generating an estimated frame signal at the conclusion of the bit counting step;

comparing the detected data frame of step to the estimated frame and defining a frame error to occur if the two signals do not coincide;

synchronizing the detection of errors in frames on said link to the timing of the detected data frame so as to avoid overcounting bit errors in the signal on the link;

calculating the number of frames on said link having errors as an error rate per unit of time; and assembling the error rate per unit of time for the links in a given circuit.

6. Apparatus for assembling a transmission performance profile for a circuit having a plurality of links in a network having a plurality of circuits and at least one node having an administrative module which provides error detection for at least one circuit, said apparatus comprising:

means for detecting a data frame in a signal on a link;

means for counting the bits arriving after the detection of the data frame until reaching a predetermined number of bits designating a frame;

means for generating an estimated frame signal at the conclusion of the bit counting;

means for comparing the detected data frame to the estimated frame and defining a frame error to occur if the two signals do not coincide;

means for synchronizing the detection of errors in frames on said link to the timing of the detected data frame so as to avoid overcounting bit errors in the signal on the link;

means for calculating the number of frames on said link having errors as an error rate per unit of time, and means for assembling the error rate per unit of time for the links in a given circuit.

7. The apparatus of claim 6 in which bit error detection for the present data frame is synchronized to the timing of a data frame detected in a sequence of data frames that is continuous with the present data frame.

8. The apparatus of claim 6 in which bit error detection for the present data frame is synchronized to the timing of a data frame detected in a sequence of data frames that is not continuous with the present data frame.

* * * * *